(12) United States Patent
Avalle et al.

(10) Patent No.: US 7,788,888 B2
(45) Date of Patent: Sep. 7, 2010

(54) WORK VEHICLE WITH A JOYSTICK COMMAND AND CONTROL SYSTEM

(75) Inventors: Danilo Avalle, Borgo San Dalmazzo (IT); Massimo Monchiero, Bra (IT)

(73) Assignee: Monchiero & C. S.N.C., Bra (IT)

( * ) Notice: Subject to any disclaimer, the term of this patent is extended or adjusted under 35 U.S.C. 154(b) by 177 days.

(21) Appl. No.: 12/182,308

(22) Filed: Jul. 30, 2008

(65) Prior Publication Data
US 2009/0038282 A1    Feb. 12, 2009

(30) Foreign Application Priority Data
Jul. 31, 2007    (IT)    ............... TO2007A0569

(51) Int. Cl.
*A01D 41/14*    (2006.01)

(52) U.S. Cl. .................... 56/10.2 R; 701/50

(58) Field of Classification Search ............. 37/348, 37/466; 56/10.2, 10.2 A–10.2 J, 14.6, 16.6, 56/10.8, 10.9, 11.8; 701/50; 192/18 A, 18 R, 192/85 V, 82 T, 102 R; 198/312, 313; 414/508, 414/503, 523
See application file for complete search history.

(56) References Cited
U.S. PATENT DOCUMENTS

| | | | |
|---|---|---|---|
| 5,170,614 A | 12/1992 | Williamson et al. | |
| 5,261,291 A | 11/1993 | Schoch et al. | |
| 6,012,272 A * | 1/2000 | Dillon | 56/14.6 |
| 6,442,920 B1 * | 9/2002 | Peterson et al. | 56/328.1 |
| 6,758,317 B1 * | 7/2004 | Colby | 198/312 |
| 7,640,091 B2 * | 12/2009 | Berg et al. | 701/50 |
| 2003/0037985 A1 | 2/2003 | Jeppe et al. | |
| 2005/0229576 A1 | 10/2005 | Flora et al. | |
| 2006/0201732 A1 | 9/2006 | Dunn et al. | |

FOREIGN PATENT DOCUMENTS

| | | |
|---|---|---|
| FR | 2851520 A1 | 8/2004 |
| WO | WO02/48817 A1 | 6/2002 |

* cited by examiner

*Primary Examiner*—Robert E Pezzuto
(74) *Attorney, Agent, or Firm*—Robert P. Lenart, Esq.; Pietragallo Gordon Alfano Bosick & Raspanti, LLP

(57) ABSTRACT

Self-propelled work vehicle for harvesting fruit, with a front axle, a rear axle, a steering column, an engine, a control pedal, a seat mounted in a driving position and a plurality of tools, with a control system for controlling the engine, the tools, the control pedal. The control system comprises an electronic joystick, which controls the progress of the self-propelled work vehicle for harvesting fruit so that acceleration and braking are proportional with respect to the angle is maintained when the electronic joystick is released.

19 Claims, 4 Drawing Sheets

WORK VEHICLE WITH A JOYSTICK COMMAND AND CONTROL SYSTEM

CROSS-REFERENCE TO RELATED APPLICATIONS

This application claims the benefit of Italian Patent Application No. TO2007A000569, filed Jul. 31, 2007, and titled "Work Vehicle With A Joystick Command And Control System", which is hereby incorporated by reference.

The present invention relates to a work vehicle having an integrated control, in particular to a self-propelled work vehicle for harvesting fruit.

BACKGROUND OF THE INVENTION

Self-propelled work vehicles for harvesting fruit capable of functioning both on- and off-road are provided with a series of mechanical or electric controls for the tools they operate in use.

FIG. 1 illustrates an example of a self-propelled work vehicle for harvesting fruit 1 suitable to gather fallen fruit such as nuts, almonds, plums or cider apples.

In the self-propelled work vehicles for harvesting fruit 1 of the type illustrated in FIG. 1, the series of mechanical or electric controls for the tools 11 that are used includes a sub-system of controls that are not related to the specific use. The sub-system of controls comprises the steering, acceleration and braking controls.

Acceleration and braking are typically controlled by means of control pedals 2 arranged on a floor 3 of a driving position 4.

According to the example in FIG. 1, the self-propelled work vehicle for harvesting fruit 1 also includes a steering column 5, a seat 6, a front axle 7 and a rear axle 8, an engine 9 and a storage device 10.

In self-propelled work vehicles for harvesting fruit 1 acceleration and braking can also be controlled by means of mechanical joysticks, capable of mechanically controlling via a Bowden cable the displacement of the variable displacement hydraulic pumps that govern the transmission of motive force from the engine 9 to the axles 7 and 8.

Self-propelled work vehicles for harvesting fruit 1, as illustrated in FIG. 1, can have a driving position 4, and in particular the steering column 5, arranged outside the area between the front and rear axles 7, 8.

If the steering column 5 is arranged, for example, in front of the front axle 7, any pitching of the self-propelled work vehicle for harvesting fruit 1 due to rough terrain causes considerable vertical swaying of the driving position 4 and in particular of the seat 6 on which the driver sits.

The longer an arm L between a vertical line 11 of the seat 6 and the front axle 7, the greater the vertical sway.

The problem of swaying is also felt on-board self-propelled work vehicles for harvesting fruit in which the driving position is not cantilevered with respect to the front axle 7.

Said swaying is particularly dangerous in that it causes the driver to perform involuntary movements on 5 the control systems of the self-propelled work vehicle for harvesting fruit 1, in particular on the control pedals 2, with considerable risk of the driver losing control or even being thrown out of the seat 6.

SUMMARY OF THE INVENTION

The purpose of the present invention is thus to produce a self-propelled work vehicle for harvesting fruit with a system for controlling the movements thereof and of the tools 11 that ensures safe operation even on rough terrains.

According to the present invention, said purpose is achieved with a device, as set forth in the attached claims.

BRIEF DESCRIPTION OF THE DRAWINGS

In order to better understand the present invention, a non-limiting preferred embodiment thereof will now be described by way of example with reference to the accompanying drawings, in which.

DETAILED DESCRIPTION OF THE INVENTION

Figure 1:
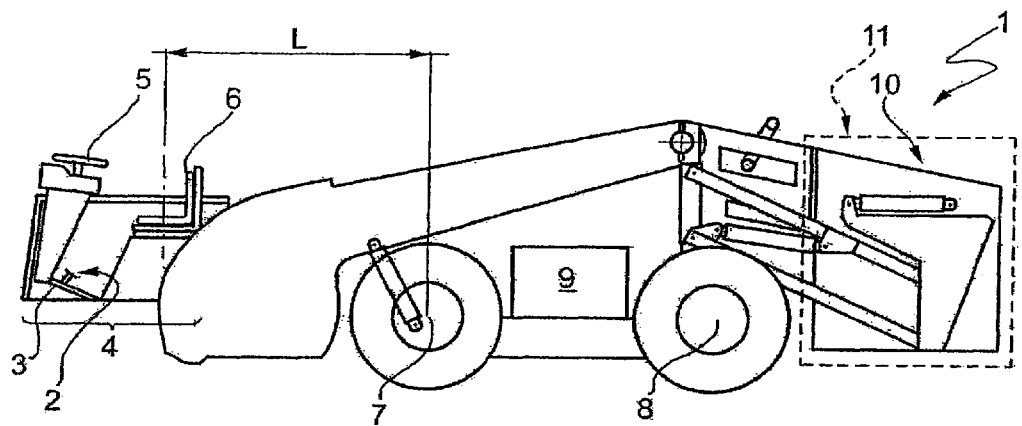
FIG. 1 is a side view of the self-propelled work vehicle for harvesting fruit of a known type.
Figure 2:
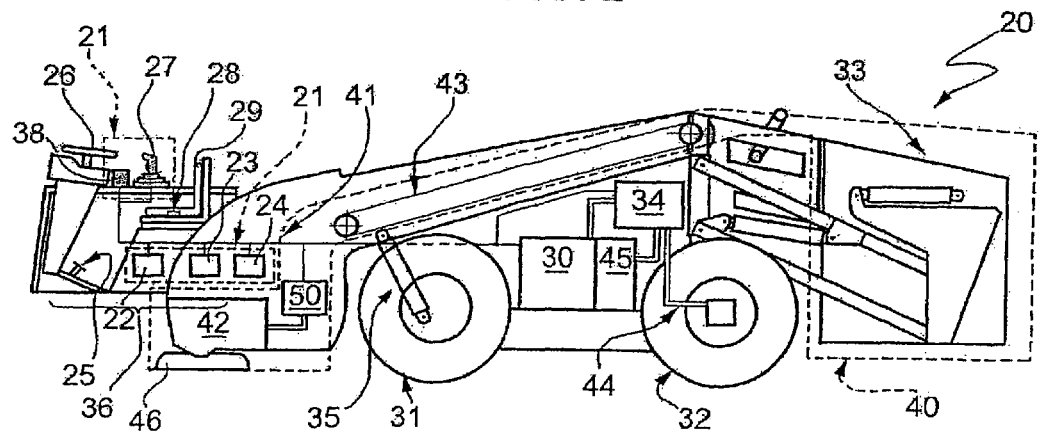
FIG. 2 is a side view of the self-propelled work vehicle for harvesting fruit according to the present invention.
Figure 3:
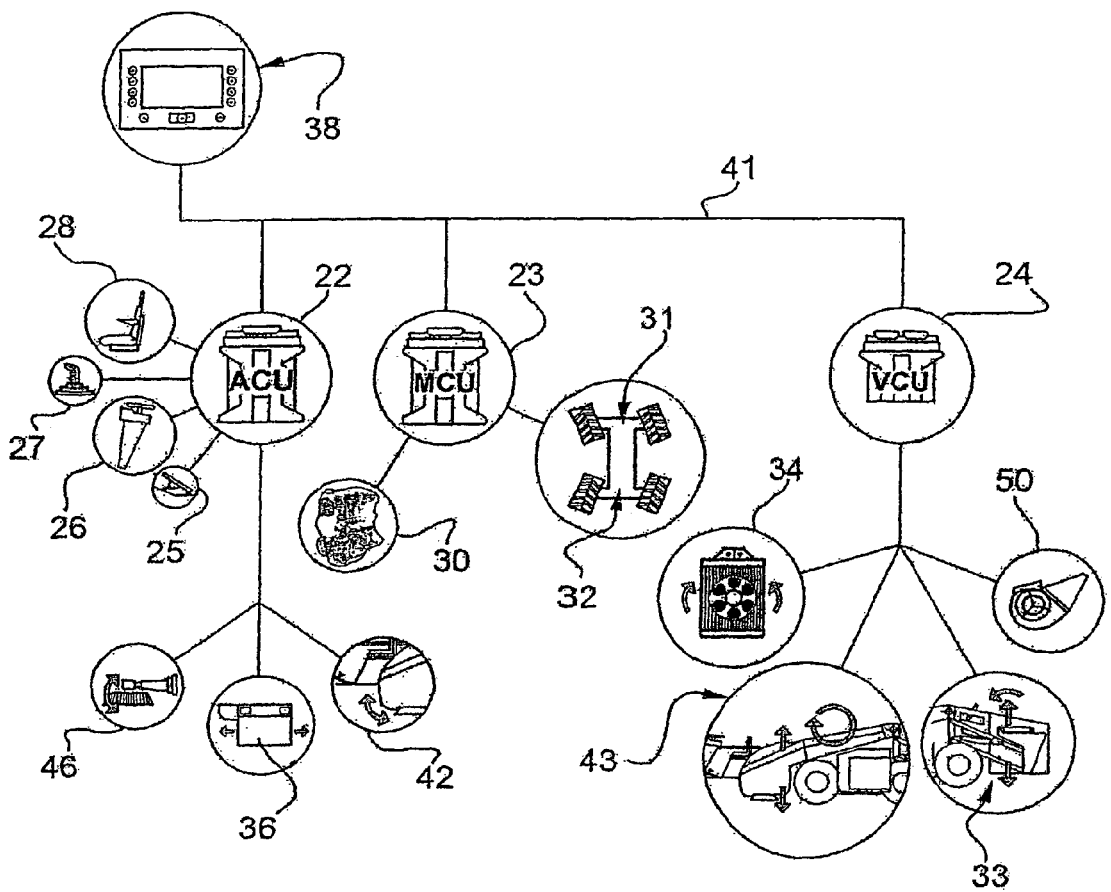
FIG. 3 is a block diagram of the control circuit of the self-propelled work vehicle for harvesting fruit.

As illustrated in FIGS. 2 and 3, a self-propelled work vehicle for harvesting fruit 20 comprises a control system 21 which comprises a plurality of control units each of which is dedicated to controlling a specific set of operations.

In particular, the control system 21 comprises a first control unit 22 (ACU, Application Control Unit), which controls all the man-machine interface devices and namely a control pedal 25 to accelerate the harvesting machine 20, a steering column 26, an electronic joystick 27, a display 38, the shifting of a driving position 36 and a safety switch 28 arranged on the seat base of a seat 29.

Moreover, the first control unit 22 controls front tools, i.e. a harvesting device 42 having a roller pivotable about a horizontal axis for gathering fruit from the ground and a pair of brushes 46 rotatable about respective vertical axes to convey the fruit towards the harvesting device 42.

The control system 21 also comprises a second control unit 23, which controls the traction systems of the self-propelled work vehicle for harvesting fruit 20, and in particular controls an internal combustion engine 30 by means of a proprietary engine ECU (not illustrated), a variable displacement hydraulic pump 45 connected to the internal combustion engine 30. In particular, the variable displacement pump 45 supplies a plurality of hydraulic motors connected to the wheels of the harvesting machine 20 to define a traction system 44 of said machine. Moreover, the variable displacement pump 45 controls the steering of a front axle 31 and of a rear axle 32 and a hydraulic (load sensing) pump controlled by the control unit 23 controls the front tools 42, 46 and the tools 40. According to the present embodiment, the front axle 31 and rear axle 32 can be steered in one of the following ways:

- front axle 31 only
- front axle 31 and rear axle 32 in the same direction as the direction of rotation of the curve defined by the rotation of the steering column 26
- front axle 31 and rear axle 32 in an opposing direction to the direction of rotation of the curve defined by the rotation of the steering column 26.

Lastly, the control system 21 comprises a third control unit 24 (VCU, Valve Control Unit) which controls the tools 40 arranged at the rear of the self-propelled work vehicle for harvesting fruit 20. In the embodiment illustrated in FIG. 2, the third control unit 24 controls a rigid bar belt conveyer 43, a cleaning device 50, comprising for instance a plurality of fans, arranged at the front or at the side of the harvesting machine 20 to create a lateral airflow suitable to move the fruit that has fallen along the rows, a storage or hopper device 33, heat exchangers 34 arranged on both sides of the self-propelled work vehicle for harvesting fruit 20 to cool the hydraulic fluid and a system 35 for raising the front harvesting device 42.

FIG. 3 illustrates the electrical connections between the first, second and third control units 22, 23, 24 and the various devices connected thereto in greater detail.

The first, second and third control units, 22, 23, 24, the electronic joystick 27 and the display 38 are electrically connected to one another by means of a CAN network.

In use, the operator controls the self-propelled work vehicle for harvesting fruit by means of the steering column 26, the control pedal 25, the electronic joystick 27 and the display 38. The control pedal 25 and the electronic joystick 27 comprise movement sensors, for instance of the potentiometer or Hall effect type. These sensors vary the amplitude of the electric current flowing to and from the control units 22, 23, 24 according to how the control pedal 25 and the electronic joystick 27 are moved.

The operating parameters of the control system 21 are set using a plurality of buttons arranged on the electronic joystick 27 and on the display 38.

Different working configurations can be used, depending on whether the self-propelled work vehicle for harvesting fruit is moving on or off-road. These can be selected using a button on the display 38.

During on-road travel acceleration and braking are controlled by means of the control pedal 25; during off-road travel, characterized by a slower travelling speed, acceleration and braking can be controlled both by means of the control pedal 25 and by means of the electronic joystick 27.

The electronic joystick 27 can be moved to make the self-propelled work vehicle for harvesting fruit 20 accelerate or slow down. The electronic joystick 27 controls the displacement of the hydraulic pump 45 via electric signals sent to the first and second control units 22, 23.

Figure 4A:
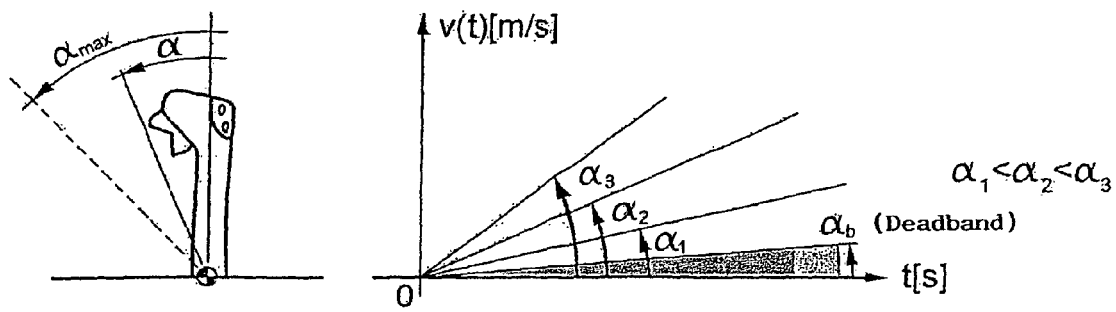
FIGS. 4a, 4b and 4c illustrate the functioning of a man-machine interface device of the self-propelled work vehicle for harvesting fruit of FIG. 1 according to different conditions of use.

When the electronic joystick 27 controls the hydraulic traction system 44, its operation is shown in FIG. 4.

In particular, the electronic joystick 27 is moveable between a home position and at least one operating position suitable to determine the value of an operating parameter, for example the angle α of inclination of the electronic joystick 27 processed by the control system 21 to control the progress of the self-propelled work vehicle for harvesting fruit 20.

Figure 4B:
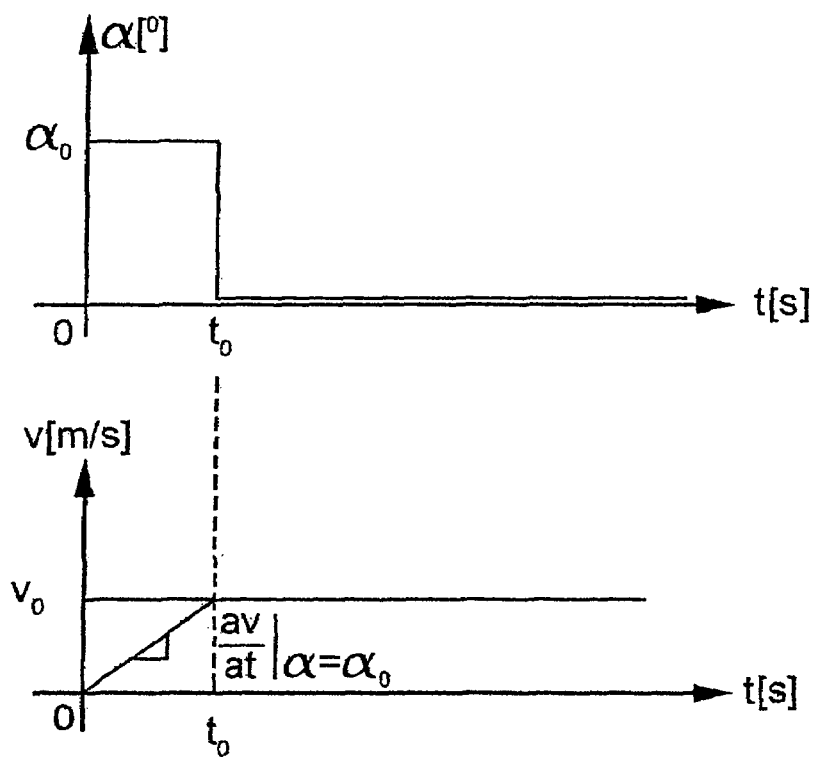

In particular, the electronic joystick 27 is tilted forwards or backwards with an angle α and the acceleration of the self-propelled work vehicle for harvesting fruit 20 varies in proportion with respect to said angle α. In particular, considering an angle of inclination $\alpha_1 < \alpha_2$, the acceleration of the self-propelled work vehicle for harvesting fruit will be greater by $\alpha_1 = \alpha_2$. When the electronic joystick 27 is released, the self-propelled work vehicle for harvesting fruit 20 maintains the speed it had reached when the joystick was released (FIG. 4b). When the electronic joystick 27 is released, it automatically returns to its home position due to the action of an appropriate device comprising for instance a spring.

FIG. 4b also illustrates a so-called "deadband" of the electronic joystick 27. In said zone, the interval of which in angular terms ($\alpha_b$) can be set as desired within a range of between 0 and 50% of the maximum angular inclination of the electronic joystick 27, with increases of 5%, movements have no effect on the electronic joystick 27. This means that the speed of the self-propelled work vehicle for harvesting fruit 20 does not change within said range.

Figure 4C:
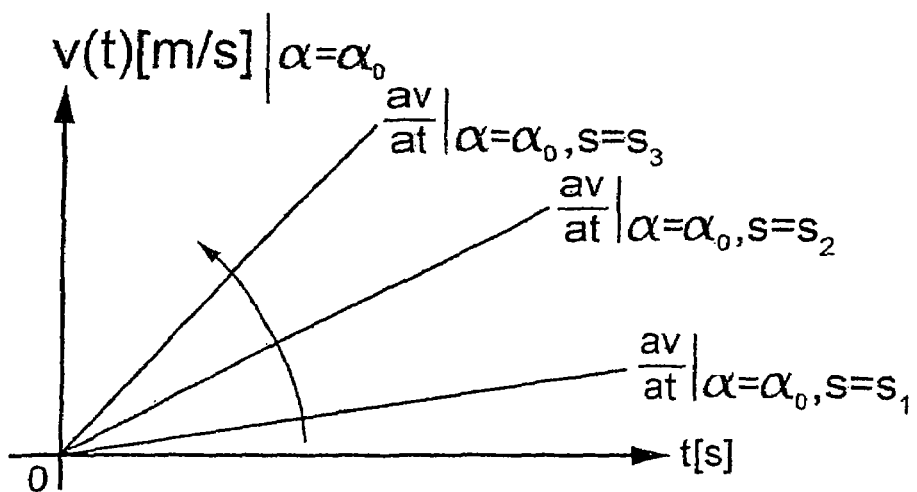

The sensitivity with which the electronic joystick 27 responds to a movement can also be set by pressing specific buttons. FIG. 4c shows a speed increase curve as a function of the time the electronic joystick 27 is pressed with the angle of inclination ($x_o$ of the electronic joystick 27 maintained stable and varying the sensitivity s of the electronic joystick 27.

In practice:

$$\left\|\frac{\delta v}{\delta t}\right\|_{a=a_0, s=s_1} < \left\|\frac{\delta v}{\delta t}\right\|_{a=a_0, s=s_2}, s_1 < s_2$$

The sensitivity of the electronic joystick 27 can be set independently for acceleration and for braking or deceleration (in the latter case the electronic joystick 27 must be pulled back).

The electronic joystick 27 can also be set to prevent the self-propelled work vehicle for harvesting fruit 20 from moving in reverse gear. Said function is set via a menu that can be opened using the buttons on the display 38.

The control pedal 25 is also controlled by means of a sensitivity control, which can be set for on-road and off-road travelling mode. In particular the control pedal 25 maintains the speed constant at the same angle of pressure and increases the speed of the self-propelled work vehicle for harvesting fruit 20 if the angle of pressure increases. When the pedal 25 is released the self-propelled work vehicle for harvesting fruit 20 decelerates with deceleration proportional with respect to the sensitivity value set for the pedal.

According to the embodiment described, the control system 21 also allows the driving position 36 to be moved from the left to the right and vice versa; said movement is performed by pressing a button and shifting the electronic joystick 27 to the left or to the right. In that case the joystick operates in an on/off mode, i.e. there is no control over the speed with which the driving position 36 is changed.

Figure 5:
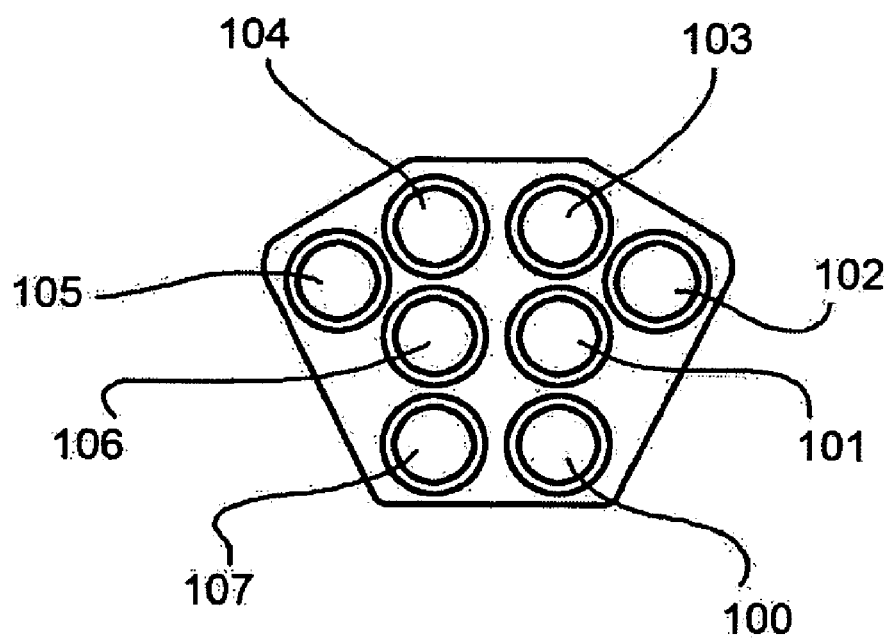
FIG. 5 is a detailed view of the man-machine interface device of FIG. 4.

In the embodiment described, the electronic joystick 27 (FIG. 5) incorporates a series of buttons suitable to perform different operations. In particular there are buttons to activate the front harvesting device 42 (button 100), to empty the storage device 33 (button 101), to select the method of shifting the driving position 36 (button 102), to activate the conveyor belt (43) (button 103) and for the fans 32 (button 104). Moreover there is a button to activate the electronic joystick 27 as an interface to control acceleration and/or deceleration (button 105) and a trigger 106 to raise and lower the system 35 to raise the front harvesting device 42.

The control system 21 provides for at least two travel modes of the self-propelled work vehicle for harvesting fruit 20. In the embodiment described, the control system 21 is configured to have:

a first fast travel mode, in which acceleration and braking of said self-propelled work vehicle for harvesting fruit 20 are controlled by means of the control pedal 25 and in which no tools 40 can be activated;

a second slow travel mode, in which acceleration and braking of the self-propelled work vehicle for harvesting fruit 20 can be controlled by the control pedal 25 and by the electronic joystick 27. During the slow travel mode, the tools 40 can be operated.

Lastly, the electronic joystick 27 incorporates a button 107 to activate an end-of-row function. When the self-propelled work vehicle for harvesting fruit 20 reaches the end of a row, the button can be pressed to activate an automatic sequence of a plurality of functions, including: raising the front harvesting device 30 or continuing to operate the conveyor belt 43 for a given time (necessary in order for the harvested fruit to be stored in the storage device 33 and for the conveyor belt 43 to be emptied). When the button is pressed again, the functions are performed in reverse.

The control system 21, in the embodiment described, allows some operating parameters of the end-of-row function to be modified, including, for instance a time necessary to raise the front harvesting device 30, a time for which the conveyor belt 31 is to keep turning and the engine speed during this phase.

The end-of-row function is deactivated by pressing the button 107 a second time. When the button 107 is pressed a second time, the operations performed during the end-of-row function are performed in reverse order with respect to that in which they are performed when the button 107 is pressed a first time, corresponding to the enabling of the end-of-row function.

All the buttons 100-107 on the electronic joystick 27 are only enabled for use during the slow travel mode.

As regards the safety of the self-propelled work vehicle for harvesting fruit 20, a safety switch 28 turns the engine 30 off if the driver's presence on-board is no longer detected. This avoids a series of not negligible, serious accidents that would otherwise be possible when using the self-propelled work vehicle for harvesting fruit 20. In particular, the safety switch 28 is a weight sensor current cut-off switch, suitably gauged so that even lightweight adults can keep it closed even in case of vibrations, which cuts off the current by opening a switch when the weight falls below a given value.

The control system 21 also envisages a self-diagnosis algorithm capable of detecting alarms or malfunctions of the control units 22, 23, 24, the electronic joystick 27, the control pedal 25 or engine 30; depending on the severity of the alarm that is received suitable messages are displayed on the display 36, warning lamps light up or the power supply to the engine 30 is cut off causing the self-propelled work vehicle for harvesting fruit 20 to be switched off.

The advantages that can be obtained with the self-propelled work vehicle for harvesting fruit described herein are clear from the above description. In particular, the self-propelled work vehicle for harvesting fruit described above allows greater ease and safety of use, guaranteed by the centralized control of most of the operating functions using a single control joystick. The control joystick, the sensitivity of which is variable and can be set by the user, controls the acceleration and braking of the self-propelled work vehicle for harvesting fruit 20 according to the angle at which it is tilted respectively forwards or backwards; when the joystick is released the speed is kept constant and moreover the speed does not change if the joystick is tilted at an angle of less than a given sensitivity deadband angle; the integrated control circuit 21 also comprises an end-of-row function that allows a series of operations to be performed automatically in sequence.

Lastly, it is clear that modifications and variations may be made to the self-propelled work vehicle for harvesting fruit described herein without departing from the scope of the present invention, as described in the appended claims. In particular, the self-propelled work vehicle for harvesting fruit can be provided with operating devices other than those mentioned in the preferred embodiment.

The self-propelled work vehicle for harvesting fruit can for instance be equipped with aerosol spraying devices, filters for cleaning beaches along coastlines or even road-cleaning devices. The joystick mounted on the self-propelled work vehicle for harvesting fruit can integrate the function of controlling the steering of the front and rear axles instead of the steering column. Finally, the self-propelled work vehicle for harvesting fruit can have the driving position arranged inside the area between the front and rear axles. Moreover the harvesting devices 42, 26 can be mounted laterally, on the sides of the self-propelled work vehicle for harvesting fruit 20.

Alternatively, the electronic joystick 27 can be managed by the first control unit 22 so as to cause the self-propelled work vehicle for harvesting fruit 20 to accelerate regardless of the angle cc at which it is tilted and on the basis of a single previously set acceleration ramp.

In this case the speed that is reached is proportional to the time t for which the electronic joystick 27 is maintained tilted.

When the electronic joystick 27 is released, the speed that is reached is maintained until a new command is sent.

The invention claimed is:

1. Self-propelled work vehicle for harvesting fruit (20), comprising an internal combustion engine (30) and a hydraulic traction system (44) connected to said internal combustion engine (30) and a plurality of tools (40) for harvesting and processing the fruit, characterized in that said self-propelled work vehicle for harvesting fruit (20) is provided with a control system (21) comprising a multi-function electronic joystick (27) to control said hydraulic traction system (44) and said tools (40), wherein said electronic joystick (27) is moveable between a home position and at least one working position suitable to determine the value of an operating parameter ($\alpha$, t) processed by said control system (21) to control the progress of said self-propelled work vehicle for harvesting fruit (20), said control system (21) being configured to control at least the acceleration of said self-propelled work vehicle for harvesting fruit (20) proportionally with respect to said operating parameter ($\alpha$, t) and to maintain the speed reached at a constant value after said electronic joystick (27) has been released and automatically returns to said home position.

2. Self-propelled work vehicle for harvesting fruit (20) according to claim 1, wherein said operating parameter comprises one of the angle of inclination ($\alpha$) of said electronic joystick (27) with respect to said home position and the time (t) for which said electronic joystick (27) is maintained in said operating position.

3. Self-propelled work vehicle for harvesting fruit (20) according to claim 1, wherein said control system (21) is configured to store a minimum value ($\alpha_b$) of said operating parameter ($\alpha$, t) below which said electronic joystick (27) has a sensitivity deadband zone around said home position; said sensitivity deadband zone having an amplitude equal to the minimum value ($\alpha_b$) adjustable between 0 and a fixed percentage of the maximum value of said operating parameter ($\alpha$, t).

4. Self-propelled work vehicle for harvesting fruit (20) according to claim 1, also comprising a front axle (31), a rear axle (32), a steering column (26), wherein said steering column (26) is arranged so as to be cantilevered in front of the front axle (31).

5. Self-propelled work vehicle for harvesting fruit (20) according to claim 1, wherein said control system (21) is a distributed control system.

6. Self-propelled work vehicle for harvesting fruit (20) according to claim 5, wherein said control system (21) comprises a first control unit (22); said first control unit (22) controlling man-machine interface means (26, 27, 25, 28) and at least a second control unit (23) electrically connected to said first control unit (22) via a data exchange network (41) and suitable to control at least one of said internal combustion engine (30), said hydraulic traction system (44) and the steering of said front axle (31) and rear axle (32).

7. Machine according to claim 6, comprising a third control unit (24) to control at least some of said tools (40).

8. Self-propelled work vehicle for harvesting fruit (20) according to claim 7, wherein said first and second control unit (22, 23) hierarchically control the third control unit (24); said third control unit (24) being at a lower hierarchical level than that of the first and second control unit.

9. Self-propelled work vehicle for harvesting fruit (20) according to claim 6, characterized in that said man-machine interface means comprise at least one of said electronic joystick (27), said steering column (26), a control pedal (25) and a safety switch (28) to turn said internal combustion engine (30) off in case of an emergency; said distributed control system (21) also comprising a display (38) for displaying a plurality of operating parameters of the self-propelled work vehicle for harvesting fruit (20).

10. Self-propelled work vehicle for harvesting fruit (20) according to claim 9, wherein said control pedal (25) comprises a sensitivity (s) control that is electronically adjustable by means of said first control unit (22); said sensitivity (s) control acting both in the pressed phase and in the released phase of said control pedal (25) with independent values.

11. Self-propelled work vehicle for harvesting fruit (20) according to claim 9, wherein said safety switch (28) detects the weight of a driver seated on said seat (29) being in a first state when said driver is present and in a second state when said driver is absent; said second state of said safety switch sending a signal to turn the engine (30) off to said first control unit (22).

12. Self-propelled work vehicle for harvesting fruit (20) according to claim 1, wherein said electronic joystick (27) comprises a plurality of buttons (100-107) suitable to control said tools (40).

13. Self-propelled work vehicle for harvesting fruit (20) according to claim 1, wherein said control system (21) is configured to perform a function of controlling the sensitivity of said electronic joystick (27); said sensitivity (s) control function increasing or decreasing with discreet steps an acceleration (a) of the self-propelled work vehicle for harvesting fruit (20), an angle of inclination of the electronic joystick (27) being fixed at $\alpha=\alpha(0)$; it being possible to set said sensitivity s to various discrete and independent values for positive or negative accelerations.

14. Self-propelled work vehicle for harvesting fruit (20) according to claim 1, wherein said tools (40) comprise a harvesting device (42), a storage device (33), a conveyor belt (43) to transfer the fruit gathered by said harvesting device (42) towards said storage device (33), a system (35) for raising said harvesting device (42). There is a cleaning device suitable to generate an airflow longitudinally or transversely with respect to the longitudinal axis of said self-propelled work vehicle for harvesting fruit (20).

15. Self-propelled work vehicle for harvesting fruit (20) according to claim 1, wherein the distributed control system (21) is configured to perform an end-of-row function which is activated by means of said electronic joystick (27) whereby a pre-defined sequence of two or more functions associated with said tools (40) is performed automatically and said sequence can be repeated in reverse order.

16. Machine according to claim 14, wherein said end-of-row function comprises the automatic execution of at least the following operations: operating the conveyor belt (43) for a predefined time and maintaining a constant speed of the engine (30) which can be set by the user to various values.

17. Self-propelled work vehicle for harvesting fruit (20) according to claim 7, wherein said first, second and third control units (22, 23, 24) also comprise a port for connection to external computers; said connection port enabling said first, second and third control units (22, 23, 24) to be re-programmed.

18. Self-propelled work vehicle for harvesting fruit (20) according to claim 9, wherein said distributed control system (21) is configured to manage:
  a first fast travel operating mode, in which acceleration and braking of said self-propelled work vehicle for harvesting fruit (20) are managed by means of said control pedal (25) and in which no tools (40) can be activated;
  a second slow travel operating mode, in which the acceleration and braking of the self-propelled work vehicle for harvesting fruit (20) can be managed both by the control pedal (25) and by the electronic joystick (27).

19. Self-propelled work vehicle for harvesting fruit (20) according to claim 9, wherein at least one of said control pedal (25) and electronic joystick (27) are controlled by means of an electronic filtering function of said operating parameter; said filtering function eliminating the high-frequency components of the commands received from said control pedal (25) and said electronic joystick (27).

* * * * *